United States Patent [19]

Innes et al.

[11] 3,710,612
[45] Jan. 16, 1973

[54] FLOAT OPERATED SIGNALLING DEVICE

[75] Inventors: Robert Innes, Beaconsfield; Ernest Albert Morrison, Gerrards Cross, both of England

[73] Assignee: Roland Trist Controls Limited, Slough, Buckinghamshire, England

[22] Filed: April 26, 1971

[21] Appl. No.: 137,443

[30] Foreign Application Priority Data

May 8, 1970    Great Britain.....................22,397/70

[52] U.S. Cl..................73/1 R, 73/322.5, 73/DIG. 5, 340/410
[51] Int. Cl.............................................G01f 25/00
[58] Field of Search........73/1 R, 305, 307, 314, 319, 73/322.5, 313, DIG. 5; 340/410

[56] References Cited

UNITED STATES PATENTS

| 2,370,099 | 2/1945 | Werder | 340/410 UX |
|---|---|---|---|
| 2,547,526 | 4/1951 | Hilliard | 340/410 UX |
| 2,588,761 | 3/1952 | Raby | 340/410 UX |
| 2,798,214 | 7/1957 | Rowell | 340/410 |
| 3,014,205 | 12/1961 | Boehm | 340/410 |
| 3,060,717 | 10/1962 | Howe | 73/1 R |

Primary Examiner—Louis J. Capozi
Assistant Examiner—Joseph W. Roskos
Attorney—Holcombe, Wetherill & Brisebois

[57] ABSTRACT

The invention is concerned with a float operated signalling device of the kind in which a magnet follows the movement of a float in a liquid container and operates signal controls through a non magnetic wall. An open topped pan having a drain opening is attached to the magnet/float assembly and an auxiliary liquid supply is provided for depositing liquid into the pan at a rate greater than that at which it can drain out of the pan. When the pan contains liquid the float is dunked below the liquid in the container so that the magnet operates the signal controls for test purposes.

9 Claims, 2 Drawing Figures

FLOAT OPERATED SIGNALLING DEVICE

The invention is concerned with float operated signalling devices, such as electrical or pneumatic switches or proportional controls, for use in sensing the liquid level in a container, such as a boiler, and possibly controlling automatically some related function such as the supply of liquid to the container or the firing of the boiler. The device is of the kind having a float which follows changes in the liquid level in the container, the float being mechanically connected to a magnet which thus follows the movement of the float and is movable to and fro inside but adjacent to a non-magnetic wall part of the container. Magnetically operated switch contacts or other signal controls are mounted on the outside of the wall part and are actuated by the changing magnetic field emanating from the magnet as the magnet moves to and fro, usually up and down.

It is desirable, with this type of system, to be able to test whether a device is functional particularly if it incorporates a switch used as a low level alarm or as a burner cut out. For test purposes it is necessary to move the magnet, and consequently move the float into the liquid, without necessarily changing the liquid level. One previous proposal for meeting this problem has involved the provision of a magnetic armature connected to the magnet together with a magnetic actuator which can be used to influence the armature through a non-magnetic wall part of the container to move the magnet and float and test the device. This is not entirely satisfactory for two reasons. First, the system has to be increased in size to accommodate the extra non-magnetic wall part and armature and, secondly, the armature may retain some magnetism and this may influence the co-operation between the magnet and signal controls during normal operation.

In accordance with the present invention, in a float operated signalling device of the kind in which a magnet follows the movement of a float, the magnet actuating signal controls through a non-magnetic wall part of a main liquid container; an open auxiliary liquid container is mounted above and connected to the float, in use, within the main liquid container, the auxiliary container having an open drain outlet through which liquid can run out of the auxiliary container into the main container, and there being means for charging liquid into the auxiliary container at a rate greater than that at which it can drain out of the auxiliary container so that when liquid is so supplied to the auxiliary container the effective weight of the float and associated parts is increased and the float sinks, in use, in the liquid in the main container, this movement of the float being followed by the magnet which thus moves and actuates the signal controls for test purposes.

When the supply of liquid to the auxiliary container is stopped, the liquid in the auxiliary container drains out into the main container and consequently the float and associated parts assumes its previous weight and equilibrium is again restored for normal operation.

The liquid supplied to the auxiliary container during the testing operation will enter the main liquid container and it follows that the supply of liquid to the auxiliary container can be provided by a simple redirection of the liquid feed to the main container when testing is to be carried out. For example in the case of a boiler, the water will normally be pumped to the boiler by a pump through a conduit when replenishment is required. The pump may, for testing, supply the water through a shut-off valve to a duct which passes into the boiler and terminates at a nozzle which is arranged to direct a jet of water into the auxiliary container. The valve is opened to allow the water to flow through the duct into the auxiliary container during testing but at other times the valve will be closed. The valve may be solenoid operated, thus making remote controlled manual or automatic testing possible. In any case, the system remains completely sealed during testing.

The auxiliary container may be in an open topped pan having at least one perforation in its wall, rather in the manner of a colander. This auxiliary container may be mounted directly on top of the float or above the float on a stem or rod by means of which the float is connected to the magnet.

One example of a boiler installation incorporating a multiple level switch device in accordance with the present invention is illustrated in the accompanying drawings, in which.

Figure 1:
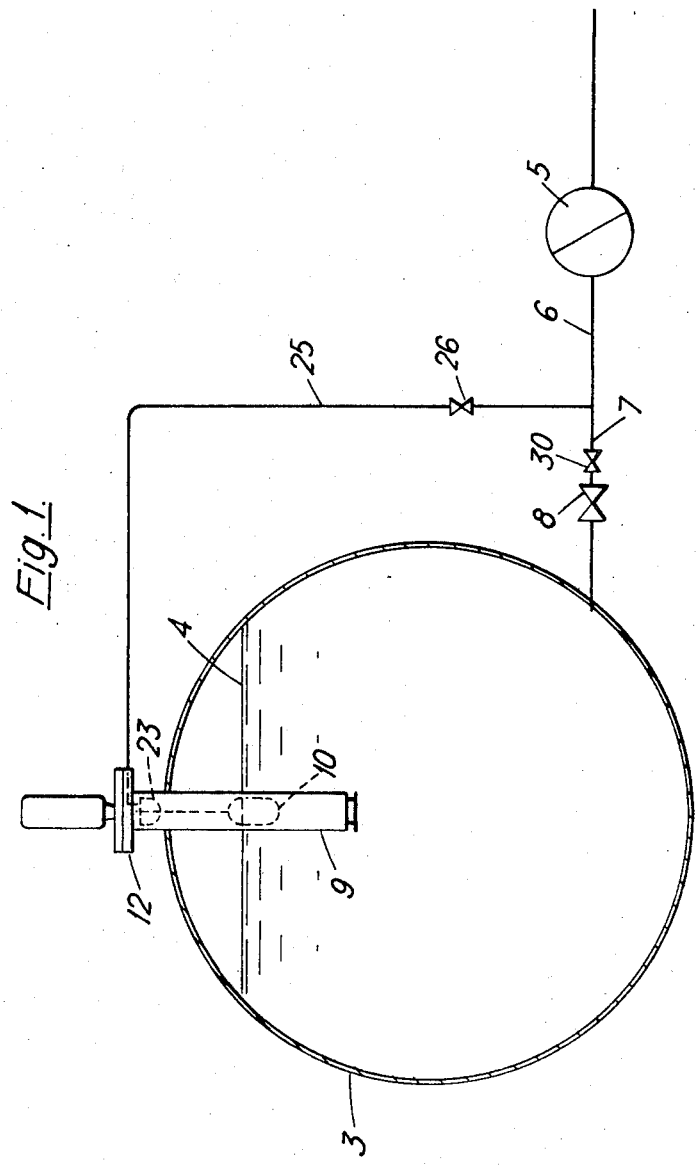
FIG. 1 is a diagrammatic elevation of the installation.

As shown in FIG. 1, the installation comprises a boiler 3 containing water 4 and arranged to be replenished by means of a pump 5 which pumps water through conduits 6 and 7 through a non return feed check valve 8 into the boiler.

The switch device comprises a cage 9 which is welded or otherwise sealed into the top wall of the boiler 3, and contains a float 10 on the lower end of a stem 11. The upper end of the cage 9 is provided with a flange 12 to which a closure plate 13 is bolted with the interposition of a gasket 14. The closure plate 13 supports a switch-housing 15 incorporating a non-magnetic stainless steel tube 16 the lower end of which has screwed onto it a centrally perforated guide 17. The stem 11 extends up through the central aperture in the guide 17 and into the tube 16 where it supports a permanent bar magnet 18.

Mounted inside the housing 15 and at fixed different heights alongside the tube 16 are two magnetically responsive switch units 19 and 20, although more than two units may be provided at choice. These units may be conventional magnetic reed switch units, or moving magnet switch units, such as that described in our British Pat. specification No. 1153297. The switch units 19 and 20 are connected by external leads to an appropriate indicating and/or automatic control system.

The cage 9 carries a baffle 21 spaced beneath its lower open end to inhibit rising bubbles from entering the cage and disturbing the float, and is provided with vent holes 22 above the upper water level to equalize the pressure within the cage and thus ensure that the liquid level remains the same inside and outside the cage. When the closure plate 13 and associated switch housing are undone and removed from the cage 9, the guide 17 prevents the magnet 18 from dropping right out of the tube 16.

Figure 2:
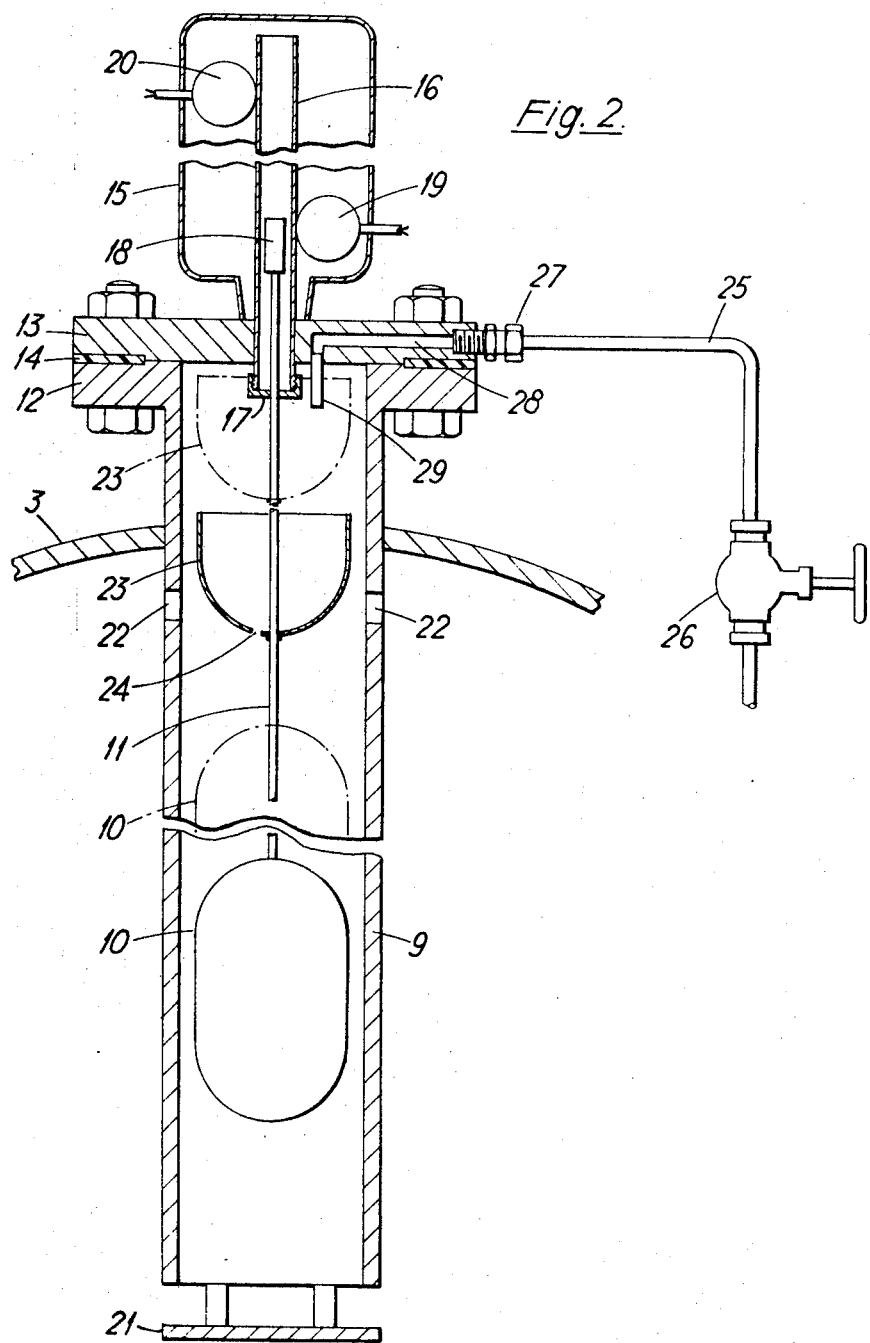
FIG. 2 is a section through the switch device.

In normal operation the magnet 18 rises and falls with the float 10 as the water level within the boiler 3 rises and falls. As the water in the boiler is driven off as steam, and the water level falls, the magnet 18 approaches the switch unit 19 and when the limiting lower level illustrated in full lines in FIG. 2 is reached the switch unit 19 is actuated. This actuation operates a warning to indicate to the operator that the boiler requires replenishment, or alternatively actuates an automatic control system. The pump 5 is started and water is pumped through the valve 8 into the boiler. As the water level in the boiler rises the float carries the magnet 18 up until the dotted line position in FIG. 2 is reached whereupon the switch unit 20 is actuated.

Actuation of the unit 20 provides a further indication to the operator that the replenishment is complete so that the water supply is cut off, or alternatively causes the automatic control system to stop the pump 5.

At intervals in use it is desirable to check the operation particularly of the lower level switch unit 19. For this purpose an open topped pan 23 having a drain opening 24 is mounted on the stem 11 above the float 10. An auxiliary water supply conduit 25, incorporating a valve 26, leads from between the pump 5 and the check valve 8 through a coupling 27 to a conduit 28 within the closure plate 13. The conduit 28 terminates in a projecting pipe nozzle 29 which is directed downwards to discharge into the pan 23.

When it is required to test the operation of the switch unit 19, the pump 5 is started and the valve 26 is opened. The pressure drop across the feed check valve 8 is appreciable by virtue of a narrow orifice throttle 30 inserted on the pump side of the check valve 8. As a result water is pumped through the conduits 25 and 28 and the nozzle 29 into the pan 23. The rate of discharge of water into the pan is greater than the rate at which it can drain away through the drain opening 24 and accordingly the weight of the pan, float and magnet unit increases and as a result the float is dunked below its buoyancy position in the water 4. The pan 23 will hold sufficient water to enable the float 10 to be dunked so low that the magnet 18 will reach the lower level position illustrated in full lines in FIG. 2 so that the switch unit 19 is actuated. Once the operator is satisfied with the test, the pump 5 is stopped and the valve 26 is closed. Any water remaining in the pan 23 then drains out through the drain opening 24 into the boiler and the float and magnet readopt their equilibrium positions.

We claim:

1. A float operated signalling device of the kind comprising a main liquid container having a non-magnetic wall part, a float within said main liquid container and a magnet coupled to and following movement of said float and actuating signal controls through said non-magnetic wall part, wherein an open auxiliary liquid container is mounted above and connected to said float, said auxiliary container having an open drain outlet through which liquid can run out of said auxiliary container into said main container, and there being means for charging liquid into said auxiliary container at a rate greater than that at which it can drain out of said auxiliary container so that when liquid is so supplied to said auxiliary container the effective weight of said float and associated parts is increased and said float sinks in the liquid in said main container, said movement of said float being followed by said magnet which thus moves and actuates said signal controls for test purposes.

2. A device according to claim 1, wherein said auxiliary container is an open topped pan having at least one perforation in its wall.

3. A device according to claim 2, wherein said auxiliary container is mounted on a stem which extends upwards from said float and carries said magnet at its upper end.

4. A device according to claim 3, wherein said float moves upwards and downwards within a cage which is fixed in position relative to said main liquid container, and said non-magnetic wall part is a tube in which said magnet is reciprocable and which is mounted together with said signal controls on a removeable closure for the upper end of said cage.

5. A device according to claim 4, wherein said auxiliary container can be charged with liquid through a conduit extending through said cage closure.

6. A device according to claim 4, wherein there are two sets of signal controls actuable individually when said magnet is at different positions along the said tube.

7. A liquid container installation comprising a main liquid container fitted with a signalling device according to claim 1, and a conduit for discharging liquid into said auxiliary container, said conduit being connected to a source of liquid under pressure and incorporating a check valve.

8. An installation according to claim 7, wherein said conduit is a branch from a main supply line for said main liquid container.

9. An installation according to claim 8, wherein said main supply line incorporates a non return check valve downstream of said conduit branch and a throttle between said check valve and said conduit branch.

* * * * *